US012230494B2

(12) United States Patent
Cross et al.

(10) Patent No.: US 12,230,494 B2
(45) Date of Patent: Feb. 18, 2025

(54) BIASED CATHODE ASSEMBLY OF AN X-RAY TUBE WITH IMPROVED THERMAL MANAGEMENT AND A METHOD OF MANUFACTURING SAME

(71) Applicant: GE Precision Healthcare LLC, Waukesha, WI (US)

(72) Inventors: Andrew Thomas Cross, Waterford, NY (US); Uwe Wiedmann, Clifton Park, NY (US); Marshall Gordon Jones, Scotia, NY (US); Carey Rogers, Waukesha, WI (US); John Scott Price, Niskayuna, NY (US); Joseph Darryl Michael, Delmar, NY (US); Sergio Lemaitre, Whitefish Bay, WI (US); Fulton Jose Lopez, Simpsonville, SC (US); Vasile Bogdan Neculaes, Niskayuna, NY (US); Steve Buresh, Cohoes, NY (US); David Wagner, Ballston Spa, NY (US)

(73) Assignee: GE Precision Healthcare LLC, Waukesha, WI (US)

( * ) Notice: Subject to any disclaimer, the term of this patent is extended or adjusted under 35 U.S.C. 154(b) by 0 days.

(21) Appl. No.: 18/636,081

(22) Filed: Apr. 15, 2024

(65) Prior Publication Data

US 2024/0282544 A1 Aug. 22, 2024

Related U.S. Application Data

(62) Division of application No. 17/977,825, filed on Oct. 31, 2022, now Pat. No. 11,990,309, which is a (Continued)

(51) Int. Cl.

*H01J 9/18* (2006.01)
*H01J 35/06* (2006.01)

(52) U.S. Cl.

CPC .............. *H01J 9/18* (2013.01); *H01J 35/064* (2019.05); *H01J 35/066* (2019.05); *H01J 2235/1212* (2013.01); *H01J 2235/1291* (2013.01)

(58) Field of Classification Search

CPC ........... H01J 9/18; H01J 35/064; H01J 35/066

See application file for complete search history.

(56) References Cited

U.S. PATENT DOCUMENTS 2,250,323 A 7/1941 Atlee
4,698,835 A 10/1987 Ono (Continued)

FOREIGN PATENT DOCUMENTS

JP 04248233 A * 9/1992
JP 2009158138 A 7/2009
WO 2015105275 A1 7/2015

OTHER PUBLICATIONS

EP application 21192484.0 filed Aug. 20, 2021—Search Report issued Feb. 4, 2022, 8 pages.

*Primary Examiner* — Chih-Cheng Kao

(57) ABSTRACT

Various systems and methods are provided for a biased cathode assembly of an X-ray tube with improved thermal management and a method of manufacturing same. In one example, a cathode assembly of an X-ray tube comprises an emitter assembly including an emitter coupled to an emitter support structure, and an electrode assembly including an electrode stack and a plurality of bias electrodes. The emitter assembly including a plurality of independent components that are coupled together. The electrode assembly including a plurality of independent components that are coupled together, and the emitter assembly being coupled to the electrode assembly.

5 Claims, 7 Drawing Sheets

Related U.S. Application Data division of application No. 17/006,496, filed on Aug. 28, 2020, now Pat. No. 11,515,117.

(56) References Cited

U.S. PATENT DOCUMENTS

| | | | | |
|---|---|---|---|---|
| 6,438,207 | B1 | 8/2002 | Chidester | |
| 2011/0116593 | A1 | 5/2011 | Zou | |
| 2013/0028386 | A1 | 1/2013 | Jeong | |
| 2014/0241498 | A1 | 8/2014 | Jeong | |
| 2015/0105275 | A1 | 4/2015 | Wong | |
| 2016/0189908 | A1 | 6/2016 | Lemaitre | |
| 2017/0271116 | A1* | 9/2017 | Virshup | H01J 35/064 |
| 2021/0037636 | A1* | 2/2021 | Raymond | H05H 1/3442 |

* cited by examiner

BIASED CATHODE ASSEMBLY OF AN X-RAY TUBE WITH IMPROVED THERMAL MANAGEMENT AND A METHOD OF MANUFACTURING SAME

CROSS-REFERENCE TO RELATED APPLICATIONS

This application is a divisional of U.S. application Ser. No. 17/977,825, filed on Oct. 31, 2022, which is a divisional of U.S. application Ser. No. 17/006,496, filed on Aug. 28, 2020, the disclosures of which are incorporated herein by reference in their entireties.

TECHNICAL FIELD

Embodiments of the subject matter disclosed herein relate to X-ray tubes and a biased cathode assembly of an X-ray tube comprising enhanced thermal management.

BACKGROUND

In an X-ray tube, ionizing radiation is created by accelerating electrons from an emitter of a cathode assembly to an anode target. The emitter is heated by a current flowing through it to generate electrons being emitted from the emitter in the form of an electron beam which is accelerated towards the anode target. A plurality of bias electrodes within the cathode assembly are used to shape, steer and focus the electron beam towards the anode target.

X-ray tube biased cathode assemblies typically include an emitter, a plurality of bias electrodes, and a plurality of bias electrode insulators separating the plurality bias electrodes. The plurality of bias electrodes and the emitter must be precisely positioned with respect to one another in order to control the electron beam generated from the emitter.

X-ray tube biased cathode assemblies may be formed out of a monolithic stack of metal and ceramic material. The metal bias electrodes must be electrically isolated from one another by ceramic bias electrode insulators. Difficulties arise if these bias electrode insulators get too hot and begin to conduct electricity. The bias electrodes are configured to operate through a range of different voltages (kV ranges) to shape, steer and focus the electron beam generated by the emitter. The metal bias electrodes and ceramic bias electrode insulators are machined out of the monolithic stack of metal and ceramic material using a wire electrical discharge machining (EDM) process.

The EDM process imposes design constraints on the cathode assembly configuration and leads to non-optimized brazing or welding between ceramic components and metal components, causing heat transfer from the emitter through the bias electrode insulators. This results in a thermal overload and an increase in current leakage as the bias electrode insulators are heated and become less insulating. The EDM process is also complex, difficult, time consuming, and often requires corrective process steps to clean and remove metal particulates, and limits the cathode assembly design by forcing the bias electrode insulators into high heat regions which could lead to a breakdown of the ceramic insulating material and may also limit power output. The resulting cathode assemblies are expensive and may be prone to thermal overload at higher power output.

Therefore, it is generally desired to fabricate a cathode assembly of an X-ray tube by assembling a plurality of individual components with high-precision tooling to reduce manufacturing cost and improve thermal performance of the cathode assembly.

BRIEF DESCRIPTION

In one embodiment or example, a cathode assembly of an X-ray tube comprises an emitter assembly including an emitter coupled to an emitter support structure, and an electrode assembly including an electrode stack and a plurality of bias electrodes. The emitter assembly including a plurality of independent components that are coupled together. The electrode assembly including a plurality of independent components that are coupled together, and the emitter assembly being coupled to the electrode assembly.

In another embodiment or example, a biased cathode assembly of an X-ray tube comprising an emitter assembly including a cathode cup, at least one emitter insulator, and an emitter. The biased cathode assembly further comprising an electrode assembly including at least one bias electrode and at least one bias electrode insulator. The cathode cup, the at least one emitter insulator, and the emitter are independent components that are coupled together. The at least one bias electrode and the at least one bias electrode insulator are independent components that are coupled together, and the emitter assembly is coupled to the electrode assembly.

In yet another embodiment or example, a method of manufacturing a cathode assembly of an X-ray tube comprising fabricating an emitter assembly, the emitter assembly including an emitter coupled to an emitter support structure. The method further comprising fabricating an electrode assembly including fabricating an electrode stack and coupling a plurality of bias electrodes to the electrode stack. The method further comprising assembling the emitter assembly and the electrode assembly together. Fabricating the emitter assembly includes fabricating a plurality of independent components to form the emitter support structure and assembling the emitter to the emitter support structure. Fabricating the electrode assembly includes fabricating a plurality of independent components to form the electrode stack, fabricating a plurality of independent components to form the plurality of bias electrodes, assembling the electrode stack, assembling the plurality of bias electrodes to the electrode stack, and assembling the emitter assembly and the electrode assembly together It should be understood that the brief description above is provided to introduce in simplified form a selection of examples that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1:
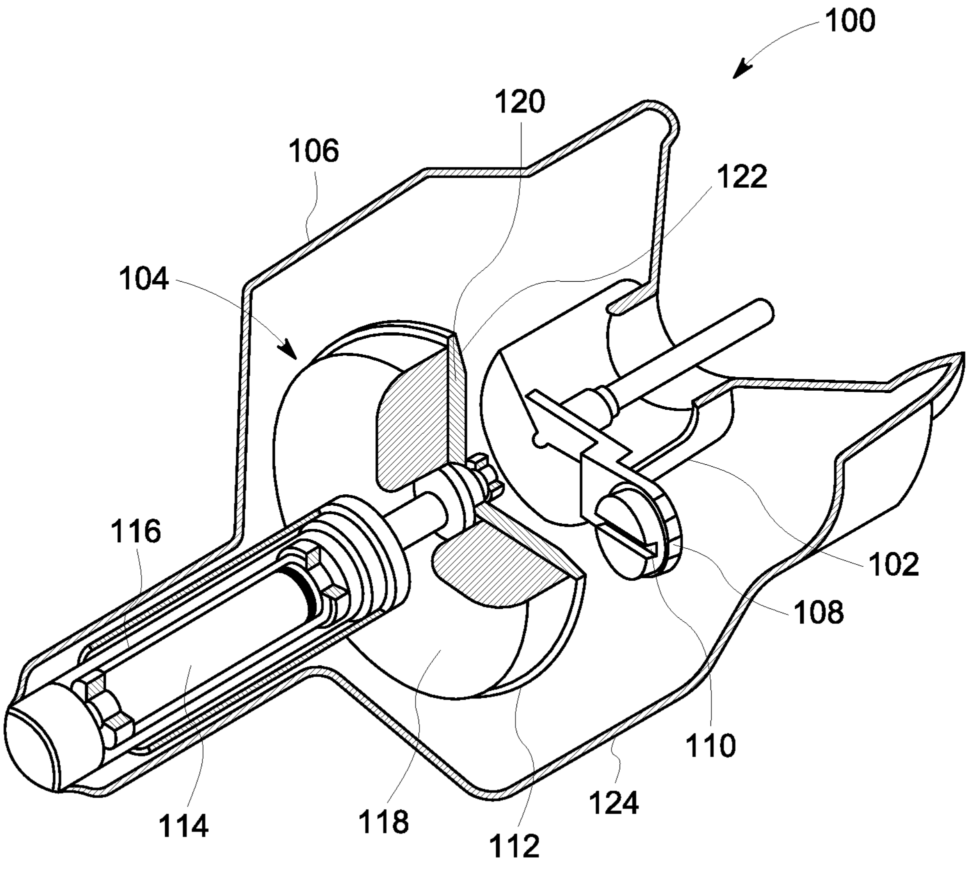
FIG. 1 illustrates a simplified schematic cutaway diagram showing the interior of an example X-ray tube.
Figure 2:
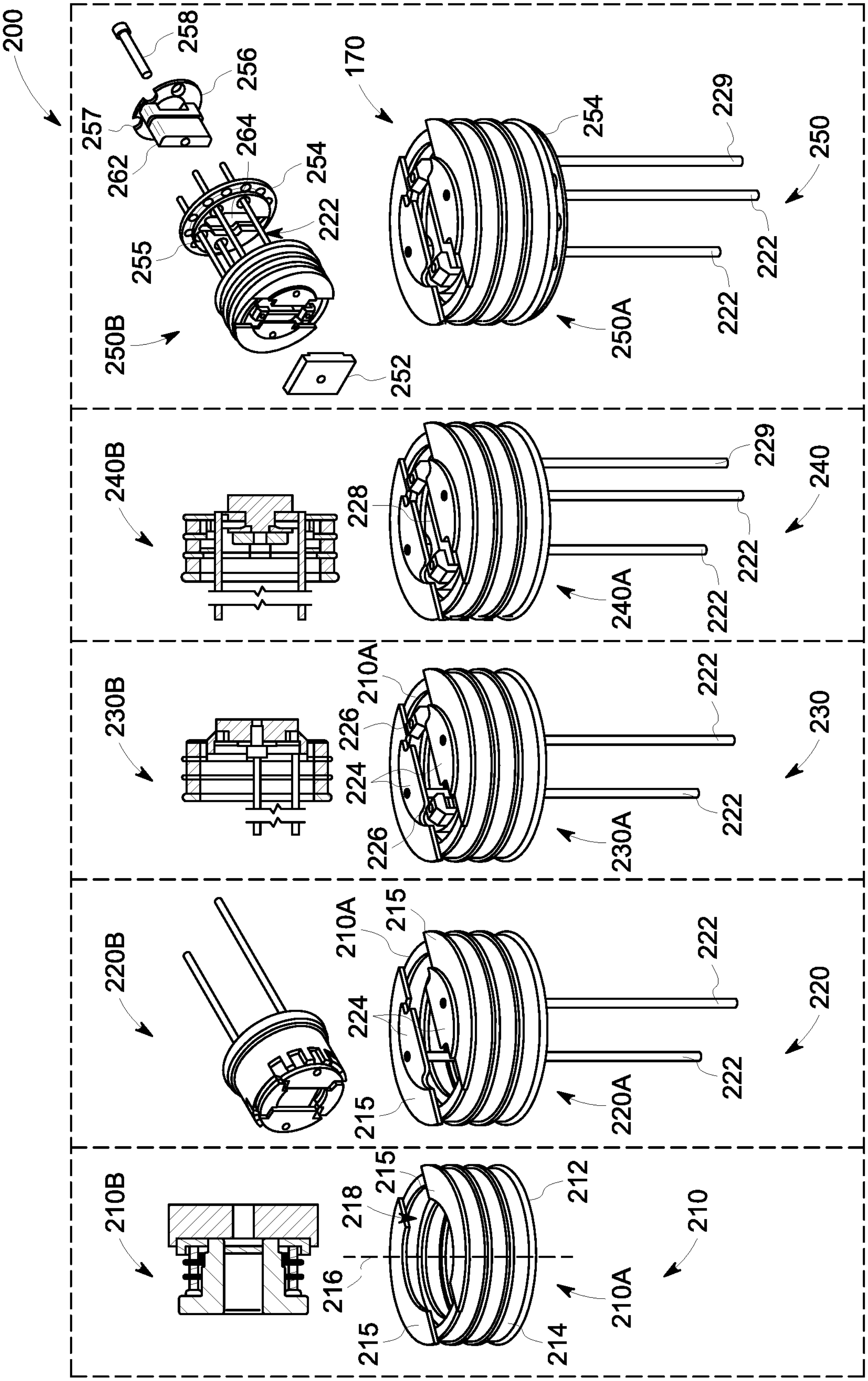
FIG. 2 illustrates a method of fabricating a cathode assembly with a plurality of high precision tooling or fixtures.
Figure 3:
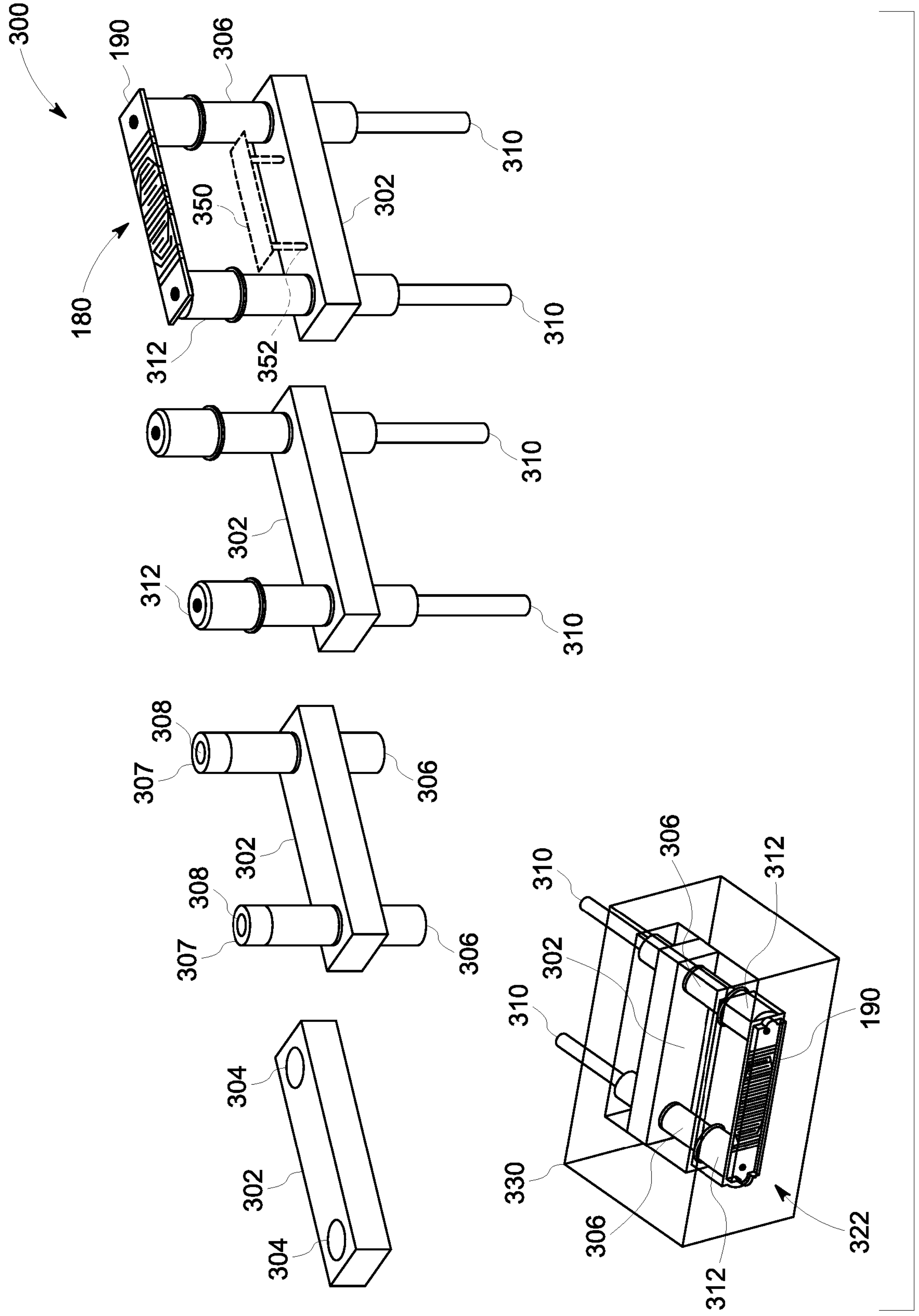
FIG. 3 illustrates the components of an emitter assembly and a method of fabricating an emitter assembly.
Figure 4A:
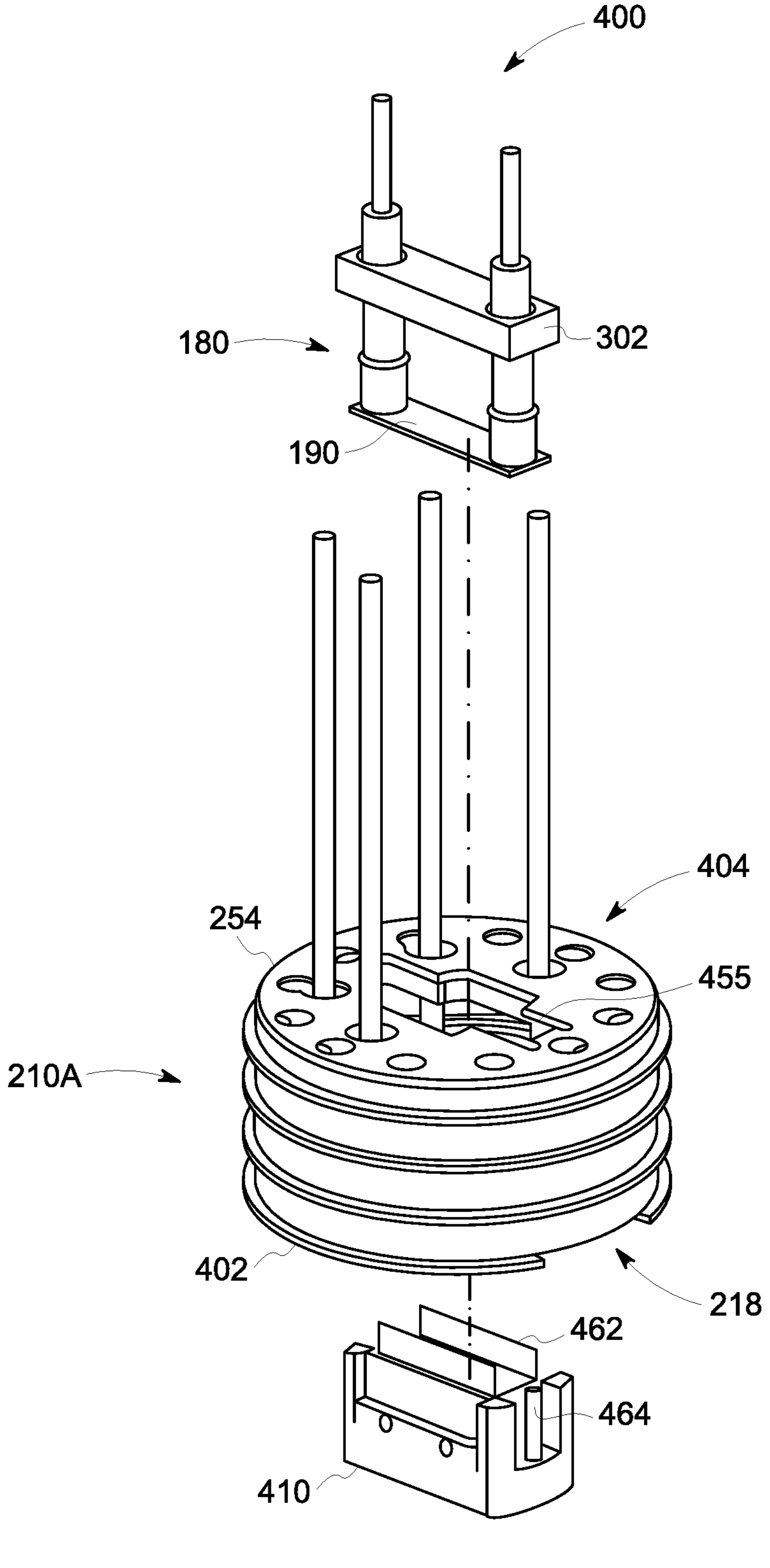
FIG. 4A illustrates an exploded view of placement of an emitter assembly within the cathode assembly with an emitter alignment tool.
Figure 4B:
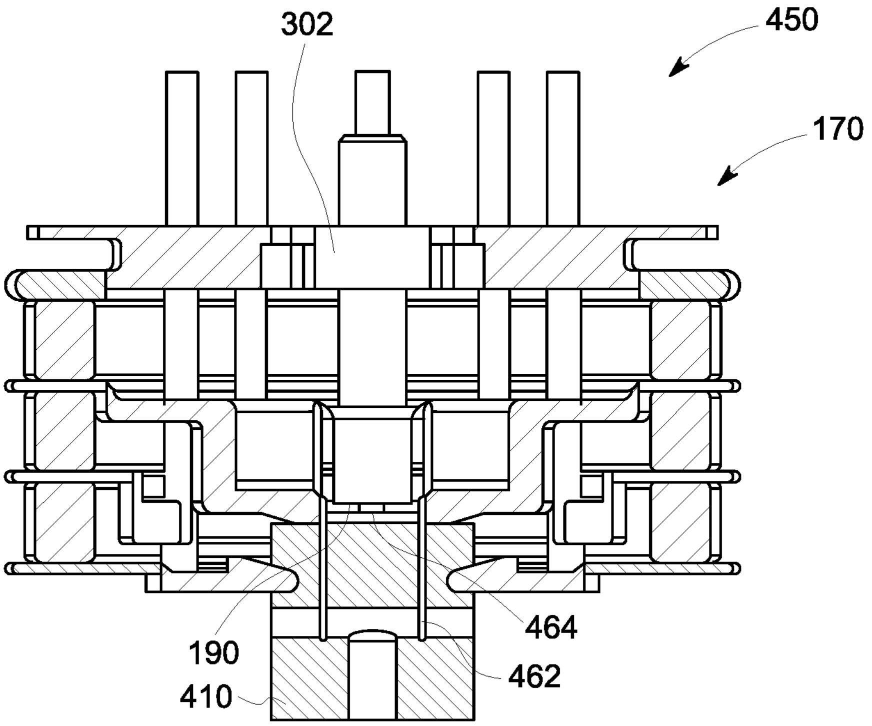
FIG. 4B illustrates a first cross-sectional view of the placement of an emitter assembly within the cathode assembly with an emitter alignment tool.
Figure 4C:
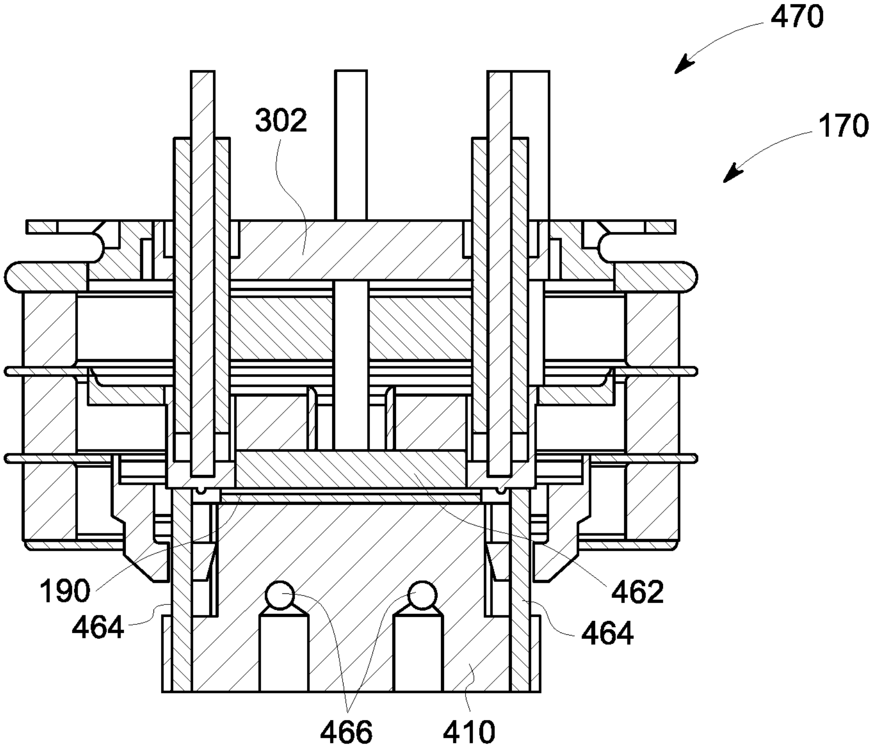
FIG. 4C illustrates a second cross-sectional view of the placement of an emitter assembly within the cathode assembly with an emitter alignment tool.
Figure 5:
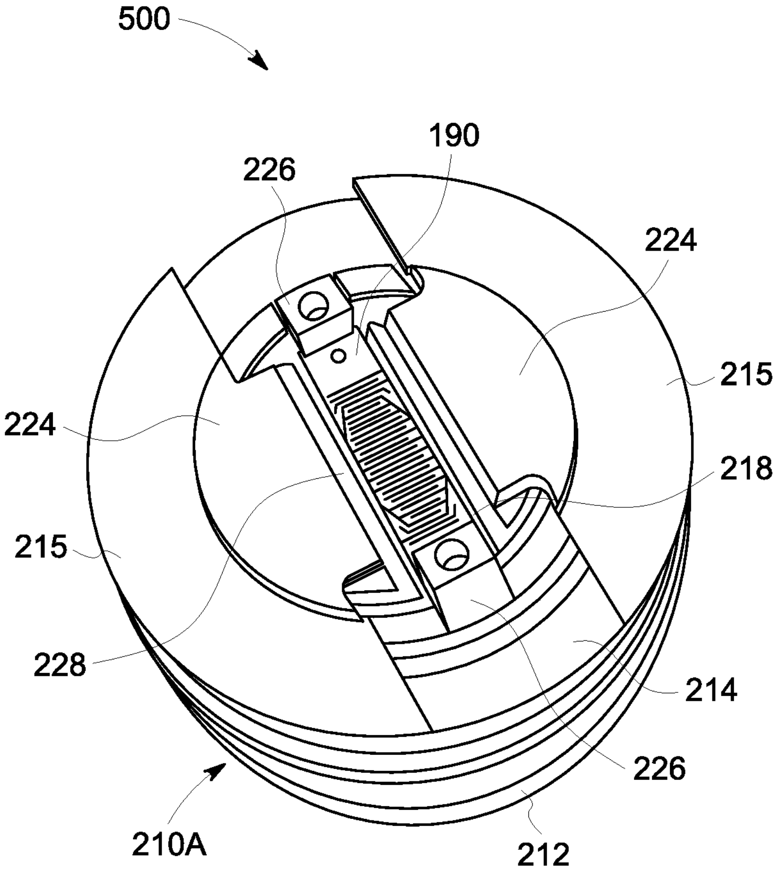
FIG. 5 illustrates a top perspective view of the cathode assembly including the emitter assembly and the plurality of subassemblies.
Figure 6A:
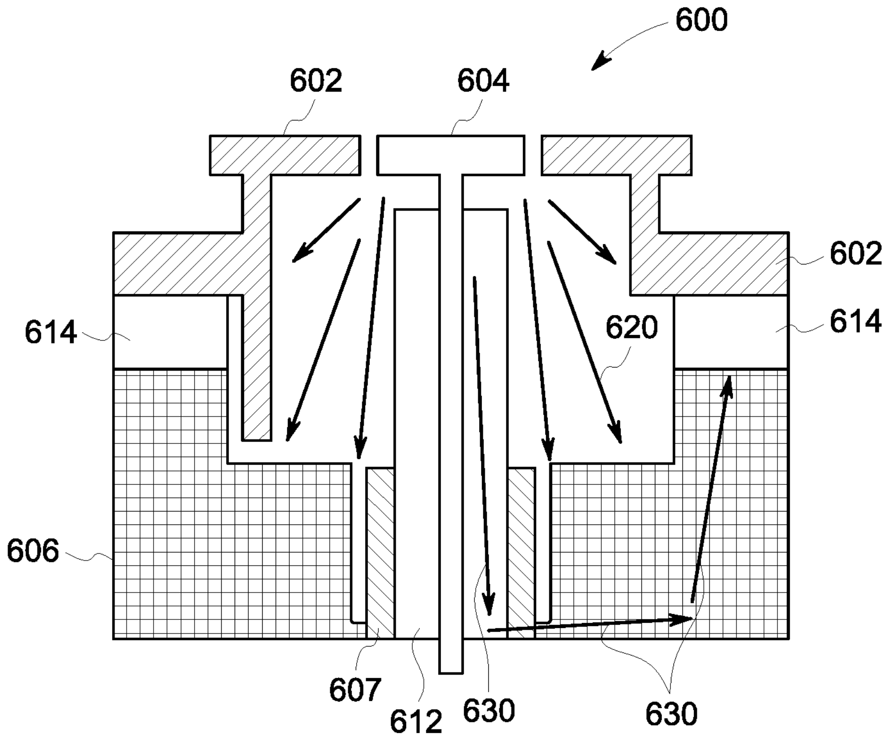
FIG. 6A illustrates a simplified schematic cross-sectional diagram showing a first example cathode assembly showing various thermal management elements.
Figure 6B:
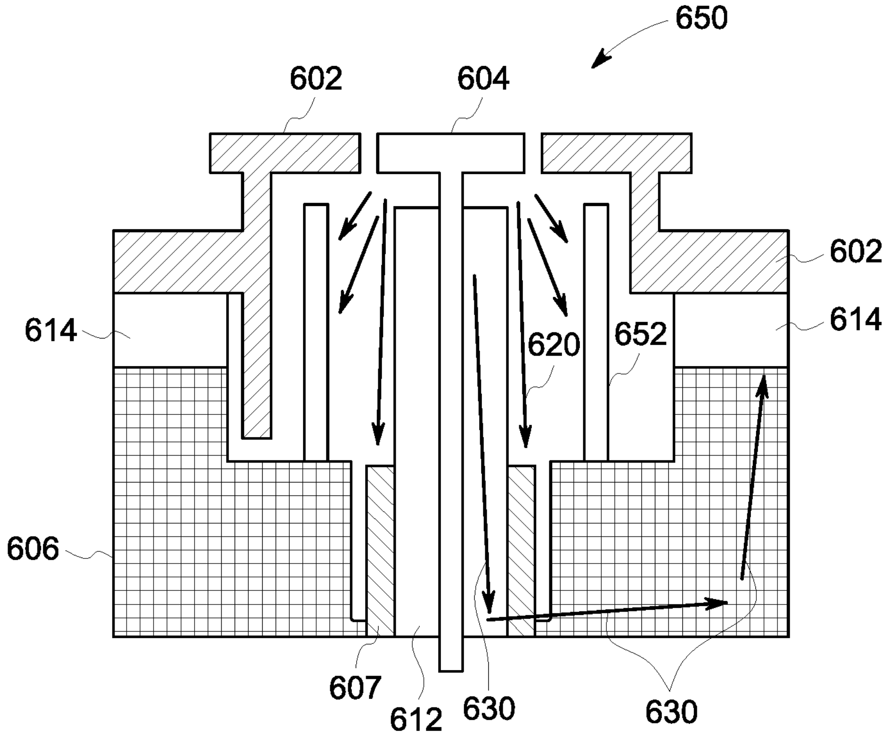
FIG. 6B illustrates a simplified schematic cross-sectional diagram showing a second example cathode assembly with a heat shield showing various thermal management elements.

The following description relates to embodiments of a cathode assembly for an X-ray tube. An example X-ray tube is illustrated in FIG. 1. FIG. 2 illustrates a method of fabricating a cathode assembly with a plurality of high precision tooling or fixtures. FIG. 3 illustrates a method of fabricating an emitter assembly. FIGS. 4A, 4B and 4C illustrate placement of the emitter assembly within the cathode assembly with an emitter alignment tool. FIG. 5 illustrates the cathode assembly including the emitter assembly and the plurality of subassemblies. FIGS. 6A and 6B illustrate different examples of a cathode assembly comprising various thermal management elements.

FIGS. 1 to 5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a “top” of the component and a bottommost element or point of the element may be referred to as a “bottom” of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 illustrates a simplified schematic cutaway diagram showing the interior of an X-ray tube 100, in accordance with an embodiment of the present disclosure. The X-ray tube 100 may be used for medical imaging examinations, such as with an X-ray imaging system, a fluoroscopic X-ray imaging system, a computed tomography (CT) imaging system, etc. In a presently contemplated configuration, the X-ray tube 100 includes a cathode assembly 102 and an anode assembly 104 that are disposed within an evacuated vacuum enclosure 106. It may be noted that the X-ray tube 100 may include other components and is not limited to the components shown in FIG. 1.

The vacuum enclosure 106 may be an evacuated enclosure that is positioned within a housing (not shown) of the X-ray tube 100. The vacuum enclosure 106 is surrounded in a dielectric cooling oil (not shown) within the housing. Further, the cathode assembly 102 includes a cathode cup 108 with a plurality of bias electrodes (not shown) and an emitter assembly with an emitter 110 that is configured to emit electrons towards an anode target 112 of the anode assembly 104. Typically, electric current is applied from an X-ray generator power supply (not shown) to the cathode assembly 102 and the emitter 110 of the emitter assembly, which causes electrons to be produced.

The anode assembly 104 may include a rotating anode target 112, a rotor 114, bearing assembly 116, and a stator (not shown) to rotate the anode target 112. The stator is located outside of the vacuum enclosure 106 and is powered to create a magnetic field to induce rotation of the rotor 114 and anode target 112. Also, the anode target 112 is positioned in the direction of emitted electrons to receive an electron beam from the emitter 110. In one example, the anode target 112 includes a base 118, a substrate 120, and a target surface 122 having a high “Z” atomic material, such as rhodium, palladium, tungsten, etc. The rotating anode target 112, spins via the rotor 114 and bearing assembly 116, creating a focal spot (not shown) of X-ray production from the anode target 112. An X-ray beam (not shown) generated from the focal spot of the anode target 112 exits the enclosure 106 through a window 124 in the enclosure 106. It should be noted that a stationary anode target may also be used instead of the rotating anode target in the X-ray tube.

The components of the cathode assembly may be fabricated separately as individual components and then joined together to form a complete cathode assembly. The components of the cathode assembly may include an electrode assembly, a plurality of bias electrodes that are attached to the electrode assembly, and an emitter assembly that is integrated within the electrode assembly and plurality of bias electrodes. The emitter assembly including an emitter support structure and an emitter that is attached to the emitter support structure. It is critically important that the plurality of bias electrodes and emitter assembly be within desired tolerances within the cathode assembly. If the spacing between the plurality of bias electrodes and emitter assembly are not within desired tolerances, then the ability of the plurality of bias electrodes to control the shape and trajectory of the electron beam is limited. Each component of the cathode assembly is individually fabricated with its own manufacturing variations as well as variations in its alignment with respect to the other components. The components are fabricated into subassemblies which then have their own tolerances. The subassemblies are joined together using high precision tooling or fixtures to position and align these critical components in the correct orientation with respect to one another, while they are connected together by brazing, welding, or other joining techniques.

The cathode assembly includes individual components that are fabricated independently, positioned using high precision tooling for proper positioning and alignment, and then brazed or welded together. Any issues in fabricating an individual component would not result in a total cathode assembly loss or rework, reducing cost. If an individual component or a subassembly fails inspection, the rework effort would be reworking that individual component or subassembly, resulting in greatly reduced cost when compared to reworking the entire cathode assembly.

The cathode assembly in an X-ray tube comprises an emitter assembly precisely positioned between a plurality of bias electrodes which control the direction and shape of the electron beam. Bias electrodes is a generic term meaning any one of a length, width or focus electrode. If the spacing between the emitter assembly and bias electrodes is outside of acceptable tolerances, it will limit the ability to control the electron beam shape or trajectory and may lead to high voltage instability.

FIG. 2 illustrates a method 200 of fabricating a cathode assembly 170 with a plurality of high precision tooling or fixtures, in accordance with an embodiment of the present disclosure.

Assembly precision is improved by designing high precision alignment tooling so that the critical components and subassemblies are positioned and aligned within critical tolerances. This means that part-to-part variation could be compensated for and each assembly accuracy would be based on the tooling rather than the individual component tolerances. This could also lead to a lower cost cathode assembly by lowering tolerances on non-essential features.

Turning to the left side of FIG. 2, a first method step 210 of fabricating an electrode assembly 210A is shown. The electrode assembly 210A comprises a plurality of alternating metal conductor rings 212 and ceramic insulator rings or bias electrode insulators 214 that are topped off with at least two top metal conductor components 215. The plurality of alternating metal conductor rings 212 and ceramic insulator rings or bias electrode insulators 214 are concentrically arranged forming an opening 218 therethrough and may be concentric about a central axis 216.

The first method step 210 illustrates a perspective view of a first subassembly 210A, or an assembled electrode assembly 210A, comprising a plurality of alternating metal and ceramic components, and a cross-sectional view of a braze fixture 210B for the electrode assembly. The braze fixture 210B is a high precision alignment tool used to align the electrode assembly 210A for brazing the plurality of alternating metal conductor rings 212, ceramic insulator rings 214, and the at least two top metal conductor components 215 together. The metal-ceramic components are joined together by brazing. In one representative method, the metal conductor rings 212 are joined to the ceramic insulator rings 214 in an alternating stacked relationship by brazing the metal conductor rings 212 to the ceramic insulator rings 214, and brazing a ceramic insulator ring 214 to the at least two top metal conductor components 215. The braze fixture 210B allows lower precision components to be assembled to higher tolerances, circumventing tolerance stack-ups of assemblies. Additionally, residual stresses induced by the means of attachment are reduced when compared with the current fabrication methods. This would reduce the risk of warping or distortion through the life of the part.

A next method step 220 illustrates a perspective view of assembling the first of a priority of bias electrodes, at least two width electrodes 224, to the electrode assembly 210A, and a perspective view of a first electrode welding fixture 220B. The at least two width electrodes 224 may be fabricated individually as width electrode subassemblies allowing for improved uniformity and/or low fabrication cost. The method step 220 illustrates a perspective view of at least two width electrodes 224 assembled to the electrode assembly 210A and a perspective view of the first electrode welding fixture 220B. The first electrode welding fixture 220B may be a width electrode welding fixture. Method step 220 illustrates a second subassembly 220A comprising the electrode assembly 210A with a width electrode subassembly including at least two width electrodes 224 attached to the at least two top metal conductor components 215. The at least two width electrodes 224 may include a rod 222 extending from each width electrode. The at least two width electrodes 224 are individually manufactured components and inserted within the opening 218 of the electrode assembly 210A for attachment to the at least two top metal conductor components 215. The electrode assembly 210A and the at least two width electrodes 224 are inserted into the first welding fixture or width electrode welding fixture 220B for positioning and alignment of the at least two width electrodes 224 on the at least two top metal conductor components 215. The width electrode welding fixture 220B is a high precision alignment tool used to align the at least two width electrodes 224 with the electrode assembly 210A and for laser welding the at least two width electrodes 224 to the at least two top metal conductor components 215, where the at least two width electrodes 224 are positioned opposite each other and spaced apart from each other within the opening 218 of the electrode assembly 210A. The electrode assembly 210A is precision aligned with respect to at least two width electrodes 224 using the first welding fixture or width electrode welding fixture 220B.

A next method step 230 illustrates a perspective view of assembling the second of a priority of bias electrodes, at least two length electrodes 226, to the electrode assembly 210A, and a cross-sectional view of a second electrode welding fixture 230B. The at least two length electrodes 226 may be fabricated as a single individual length electrode subassembly or as two separate individual length electrodes allowing for improved uniformity and/or low fabrication cost. The method step 230 illustrates a perspective view of at least two length electrodes 226 assembled to the electrode assembly 210A and a perspective view of the second electrode welding fixture 230B. The second electrode welding fixture 230B may be a length electrode welding fixture. Method step 230 illustrates a third subassembly 230A comprising the first subassembly including the electrode assembly 210A with at least two width electrodes 224 attached to the at least two top metal conductor components 215 and a length electrode subassembly including at least two length electrodes 226 attached to the electrode assembly 210A. The individual length electrode subassembly including the at least two length electrodes 226 is an individually manufactured component and inserted within the opening 218 of the electrode assembly 210A for attachment to the electrode assembly 210A. The electrode assembly 210A, the at least two width electrodes 224, and the at least two length electrodes 226 are inserted into the second welding fixture or length electrode welding fixture 230B for positioning and alignment of the length electrode subassembly including the at least two length electrodes 226 in the electrode assembly 210A. The length electrode welding fixture 230B is a high precision alignment tool used to align the length electrode subassembly including the at least two length electrodes 226 with the electrode assembly 210A and for laser welding the length electrode subassembly including the at least two length electrodes 226 to the electrode assembly 210A, where the at least two length electrodes 226 are positioned opposite each other and spaced apart from each other within the opening 218 of the electrode assembly 210A. The electrode assembly 210A is precision aligned with respect to the length electrode subassembly including the at least two length electrodes 226 using the second welding fixture or length electrode welding fixture 230B.

A next method step 240 illustrates a perspective view of assembling the third of a priority of bias electrodes, at least one focus electrode 228, to the electrode assembly 210A, and a cross-sectional view of a third electrode welding fixture 240B. The at least one focus electrode 228 may be fabricated as a single individual focus electrode subassembly allowing for improved uniformity and/or low fabrication cost. The method step 240 illustrates a perspective view of at least one focus electrode 228 assembled to the electrode assembly 210A and a cross-sectional view of the third electrode welding fixture 240B. The third electrode welding fixture 240B may be a focus electrode welding fixture. Method step 240 illustrates a fourth subassembly 240A comprising the electrode assembly 210A, at least two width electrodes 224 attached to the at least two top metal conductor components 215, at least two length electrodes 226 attached to the electrode assembly 210A, and at least one focus electrode 228 attached to the electrode assembly 210A. The individual focus electrode subassembly including the at least one focus electrode 228 may include at least one rod 229 extending from the focus electrode. The at least one focus electrode 228 is an individually manufactured component and inserted within the opening 218 of the electrode assembly 210A for attachment to the electrode assembly 210A. The electrode assembly 210A, the at least two width electrodes 224, the length electrode subassembly, and the focus electrode subassembly are inserted into the third welding fixture or focus electrode welding fixture 240B for positioning and alignment of the focus electrode subassembly including the at least one focus electrode 228 in the electrode assembly 210A. The focus electrode welding fixture 240B is a high precision alignment tool used to align the focus electrode subassembly including the at least one focus electrode 228 with the electrode assembly 210A and for laser welding the focus electrode subassembly including the at least one electrode 228 to the electrode assembly 210A, where the at least one focus electrode 228 is positioned within the opening 218 of the electrode assembly 210A. The electrode assembly 210A is precision aligned with respect to the at least one focus electrode 228 using the third welding fixture or focus electrode welding fixture 240B.

A final method step 250 illustrates a perspective view of assembling an emitter assembly to the electrode assembly 210A, and an exploded perspective view of the cathode cup welding fixture 250B. The emitter assembly is positioned into the electrode assembly, attached to the electrode assembly, and the cathode assembly 170 is completed. Method step 250 illustrates a final subassembly 250A comprising the electrode assembly 210A, at least two width electrodes 224 attached to the at least two top metal conductor components 215, a length electrode subassembly with at least two length electrodes 226 attached to the electrode assembly 210A, a focus electrode subassembly with at least one focus electrode 228 attached to the electrode assembly 210A, and an emitter assembly attached to the electrode assembly. The cathode cup welding fixture 250B comprises a top piece 252, a cathode cup support plate 254, an emitter assembly fixture 256, and a fastener 258. The cathode cup support plate 254 comprises a plurality of openings 255 configured to receive the rods 222, 229 extending from the bias electrodes. The emitter assembly fixture 256 includes a protrusion 262 that may extend through a central opening 264 in the cathode cup support plate 254. The emitter assembly fixture 256 further comprises a plurality of openings 257 configured to accommodate the rods 222, 229 extending from the bias electrodes. The fastener 258 may extend through the protrusion 262 and engage with the top piece 252 to hold the cathode cup welding fixture 250B together while the emitter assembly is laser welded to the electrode assembly 210A. In the example shown, the fastener 258 and the top piece 252 are arranged on opposite sides of the cathode assembly 170 such that the fastener 258 extends through an entire length of the cathode assembly 170 to engage with the top piece 252. In one example, the top piece 252 is arranged at a first end of the cathode assembly 170 and the fastener is arranged at a second end, opposite the first end.

The method includes inserting the emitter assembly into the emitter assembly fixture 256 of the cathode cup welding fixture 250B for positioning and alignment of the emitter assembly within the bias electrodes in the electrode assembly 210A. The cathode cup welding fixture 250B is a high precision alignment tool used to align the emitter assembly with the bias electrodes and electrode assembly 210A and for laser welding the emitter assembly to the electrode assembly 210A, where the emitter assembly is positioned within the opening 218 of the electrode assembly 210A. The electrode assembly 210A is precision aligned with respect to the emitter assembly using the cathode cup welding fixture 250B.

The relative positions of the plurality of bias electrodes with respect to each other and the emitter assembly are critical and will be further described and illustrated with reference to FIGS. 3, 4A, 4B and 4C. The emitter assembly is a separate subassembly and fabricated separately from the electrode assembly and plurality of bias electrodes.

FIG. 3 illustrates the components of an emitter assembly and a method of fabricating an emitter assembly 180, in accordance with an embodiment of the present disclosure. The emitter assembly 180 is an individually manufactured component that includes an emitter support structure 300, an emitter 190, and an optional heat shield 350.

The emitter support structure 300 provides the structure for mounting an emitter 190 thereto. The emitter support structure 300 comprises a crossbar 302 having a pair of openings 304 extending therethrough, the pair of openings positioned at opposite ends of the crossbar and configured to receive a pair of insulator posts or emitter insulators 306 therein. The crossbar 302 may be preferably made of a metal material, while the insulator posts or emitter insulators 306 may be preferable made of a ceramic material. In one example, the insulator posts 306 may be brazed to the crossbar 302. The insulator posts 306 may be hollow cylinders, each having openings 307 extending through their entire lengths. A pair of conductors 310 may be inserted through the openings 307. A first conductor 310 extends through the opening 307 in the first insulator post 306 and a second conductor 310 extends through the opening 307 in the second insulator post 306. A cap 312 may be attached to the top end 308 of each of the insulator posts 306. The caps 312 may be preferably made of a metal material and brazed to the insulator posts 306. The conductors 310 may be brazed to the insulator posts 306. In one example, the caps 312 are nickel. Following insertion of the conductors 310 through the openings 307 in the insulator posts 306, the emitter 190 is laser welded to the tops of the caps 312 of the emitter assembly 180. The emitter 190 may be preferably made of tungsten. Other welding techniques, besides laser welding, may include welding a platinum bead to facilitate bonding a tungsten emitter to a nickel cap.

A heat path from the emitter to the insulator posts 306 is created by heating the crossbar 302, which then heats the insulator posts 306 at the critical position where the insulator posts 306 couple to the crossbar 302. This is the point where the emitter insulator needs to be insulating. In one example, a heat shield 350 may be arranged below the emitter 190, attached to the top of the crossbar 302. The heat shield 350 is preferably attached to the top of the crossbar 302 by heat shield supports 352. The heat shield supports 352 may physically couple the heat shield 350 to the crossbar 302. The heat shield supports 352 may be relatively small to minimize a conductive heat path between the heat shield 350 and the crossbar 302. The heat shield 350 may protect the insulator posts or emitter insulators 306, crossbar 302, and bias electrode insulators from radiative heat from the emitter 190, such that the temperature of the insulator posts or emitter insulators 306, crossbar 302, and bias electrode insulators are cooler than it would be without the heat shield 350. Additionally or alternatively, the heat shield 350 may reflect and/or re-radiate heat back to the emitter 190.

By doing this, the temperature of the emitter may be increased at a given emitter power level. This may be beneficial in order to decrease the size of the power supply and to decrease a total heat injected into the cathode assembly. Additionally, the emitter temperature is desired to be relatively hot compared to the crossbar for desired function of the cathode assembly, while still blocking heat transfer to adjacent structures. The emitter needs to be at a given temperature for the proper function of the cathode assembly, and it is desirable to keep the emitter hot without heating up all of the other components around it. The heat shield 350 may maintain heat within a close proximity of the emitter 190, which may maintain a high temperature of the emitter 190 and enhance electron emission. It will be appreciated that the size, shape, location, and coupling of the heat shield 350 may be adjusted without departing from the scope of the present disclosure. In one example, the heat shield 350 may be directly coupled to the insulator posts 306. Additionally or alternatively, there may be more than one heat shield 350.

High precision tooling, such as an emitter support structure alignment tool 330 is used to position and align the emitter assembly 180, including the emitter support structure 300 and emitter 190 to be held together in a desired position and in alignment within the desired tolerances during welding. An opening 322 in a top of the emitter support structure alignment tool 330 allows access for a platinum bead placement and/or laser welding.

In one example, the emitter support structure alignment tool 330 may be used only during a welding process of the emitter 190 to the emitter support structure 300. The emitter support structure alignment tool 330 may be removed following the welding. During the welding, the emitter support structure alignment tool 330 may contact an outer perimeter of the emitter 190 and an outer perimeter of the crossbar 302. As the emitter support structure alignment tool 330 contacts these outer perimeters, it may maintain a desired tolerance between the emitter 190 and the crossbar 302 to arrange the emitter 190 onto a desired position.

FIG. 4A illustrates an exploded view of placement of an emitter assembly within the cathode assembly with an emitter alignment tool, in accordance with an embodiment of the present disclosure. FIG. 4B illustrates a first cross-sectional view of the placement of an emitter assembly within the cathode assembly with an emitter alignment tool, in accordance with an embodiment of the present disclosure. FIG. 4C illustrates a second cross-sectional view of the placement of an emitter assembly within the cathode assembly with an emitter alignment tool, in accordance with an embodiment of the present disclosure. Turning now to FIG. 4A, it shows an exploded view 400 of the emitter assembly 180 being inserted into the electrode assembly 210A of the cathode assembly 170. The emitter alignment tool 410 may be used to align the emitter assembly 180 within the electrode assembly 210A. In one example, the emitter alignment tool 410 is a high precision tool that enters the opening 218 of the electrode assembly 210A from a first end 402 and engages with the emitter assembly 180. The emitter assembly 180 may enter the electrode assembly 210A through an opening 455 of the cathode cup support plate 254 and into the electrode assembly 210A in one example. Additionally or alternatively, the emitter assembly 180 may be inserted through the opening 218 from a second end 404 of the electrode assembly 210A. The emitter alignment tool 410 includes at least two spacer shims 462 and at least two contact pins 464.

FIG. 4B illustrates a first cross-sectional view 450 of the placement of an emitter assembly 180 within the electrode assembly 210A of a cathode assembly 170 with an emitter alignment tool 410. An assembled cathode assembly 170 with the emitter alignment tool 410 still arranged therein is shown in the first cross-sectional view 450 in FIG. 4B. FIG. 4C illustrates a second cross-sectional view 470 of the placement of an emitter assembly 180 within the electrode assembly 210A of the cathode assembly 170 with an emitter alignment tool 410. The first and second cross-sectional views 450, 470 may differ in that the views are taken from opposite vantages of the cathode assembly 170. For example, the first cross-sectional view 450 is taken along the width of the emitter alignment tool 410 and the second cross-sectional view 470 is taken along the length of the emitter alignment tool 410.

The first and second cross-sectional views 450, 470 illustrate the emitter 190 engaged with the at least two spacer shims 462 and at least two contact pins 464 of the emitter alignment tool 410. In one example, the at least two spacer shims 462 are centering alignment shims configured to properly align or center the emitter 190 within the opening 218 of the cathode assembly 500. In one example, the at least two contact pins 464 are height alignment pins configured to set a proper height of the emitter 190. The at least two spacer shims 462 and at least two contact pins 464 of the emitter alignment tool 410 may contact the plurality of bias electrodes and the emitter 190 to properly position the emitter 190 within the plurality of bias electrodes and relative to each other within desired tolerances. Magnets 466 may couple the emitter alignment tool 410 directly to the plurality of bias electrodes while the combination of the at least two spacer shims 462 and at least two contact pins 464 locate off of the plurality of bias electrodes.

When the emitter assembly 180 is inserted within the electrode assembly 210A from the second end 404 and the emitter alignment tool 410 is inserted within the electrode assembly 210A from the first end 402, the at least two spacer shims 462 may center the emitter 190 on the emitter alignment tool 410 and at least two contact pins 464 may locate the stack vertically. The emitter assembly 180 may be arranged in the electrode assembly 210A, wherein the at least two spacer shims 462 may center the emitter 190, and space it between the plurality of bias electrodes within a desired position. The crossbar 302 of the emitter support structure 300 may be laser welded to the electrode assembly 170. In one example, the crossbar 302 is laser welded to interior portions of the electrode assembly 210A. The emitter alignment tool 410 may then be removed by pulling up and releasing the magnets.

As mentioned above, the fabrication of the cathode assembly includes strategic utilization of high precision tooling to decrease manufacturing costs. The high precision tooling may be used to align components with tolerances larger than demanded tolerances. The components may be aligned by the high precision tooling shaped to engage each of the components. The components may then be brazed or welded into place. By making high precision tooling capable of being used a plurality of times, manufacturing costs of the cathode assembly may be reduced. The proposed assembly method using high precision tooling also allows lower precision components to be assembled to higher tolerances.

FIG. 5 illustrates a top perspective view of an assembled cathode assembly 500 including an emitter assembly and a plurality of bias electrodes, in accordance with an embodiment of the present disclosure. FIG. 5 shows the assembled cathode assembly 500 including a plurality of individually fabricated components and subassemblies. The plurality of individually fabricated components an subassemblies include an electrode assembly 210A with a width electrode subassembly including at least two length electrodes 224, a length electrode subassembly including at least two length electrodes 226, a focus electrode subassembly including at least one focus electrode 228, and an emitter assembly within cathode cup including emitter support structure and emitter 190.

The electrode assembly 210A includes a plurality of alternating metal conductor rings 212 and ceramic insulator rings or bias electrode insulators 214 that are topped off with at least two top metal conductor components 215. The plurality of alternating metal conductor rings 212 and ceramic insulator rings 214 are concentrically arranged forming an opening 218 therethrough. The emitter 190 of the emitter assembly protrudes through the opening 218 of the electrode assembly 210A. The cathode assembly 500, as such, comprises a plurality of components and subassemblies fabricated separately from one another and joined together to provide a desired configuration. The plurality of individually fabricated separate components and subassemblies are used to isolate high heat components from heat sensitive components allowing for a cathode assembly having higher power outputs in similar size packaging.

A key benefit of the design of this disclosure is to separate the emitter support structure, the primary heat path, from the electrode assembly insulators, which have a limited temperature range due to leakage current. The leakage current of the insulators increases as the insulators get hotter. If the temperature is too high, the leakage current may exceed the capabilities of the cathode assembly power supply, and lead to instabilities of the voltage present on the electrode, causing a loss of electron beam control. Keeping the insulators cool is key to increasing power output of the cathode assembly for a given package size.

Increased separation between the emitter and the insulators could keep them cool but the disclosed method improves thermal management of the cathode assembly without increasing the cathode assembly dimensions or size. This allows the emitter to be spaced away from the insulators, reducing heat transferred to the insulators and providing a direct heat path from the emitter through the electrode assembly. The plurality of bias electrodes and bias electrode insulators of the bias electrode subassembly are fabricated individually, enabling geometries to be optimized and using cost efficient methods. Insulating components are included around the emitter reducing heat transfer. Selective positioning of heat shields around the emitter may enable electron beam control while reflecting heat away from the insulating components and back to the emitter, thereby increasing energy efficiency.

FIG. 6A illustrates a simplified schematic cross-sectional diagram showing a first example cathode assembly showing various thermal management elements, in accordance with an embodiment of the present disclosure. FIG. 6B illustrates a simplified schematic cross-sectional diagram showing a second example cathode assembly with a heat shield showing various thermal management elements, in accordance with an embodiment of the present disclosure.

Turning now to FIG. 6A, it illustrates a cross-section of a cathode assembly 600. In one example, the cathode assembly 600 is an example of a cathode assembly fabricated via a plurality of components or subassemblies. The cathode assembly 600 comprises at least one bias electrode 602, an emitter 604, a cathode cup 606, an interfacing material 607, an emitter insulator 612, and at least one bias electrode insulator 614. In one example, the emitter insulator 612 is an example of the insulator posts 306 of FIG. 3. In one example, the cathode cup 606 and the interfacing material 607 are metal, and may absorb heat (e.g., function as a heat sink). Arrows 620 illustrate the radiative heat paths or direction of radiative heat from the emitter 604 being radiated to various components of the cathode assembly 600. In previous prior art examples of cathode assemblies, the emitter insulator 612 and the at least one bias electrode insulator 614 are combined into a single monolithic insulator, which resulted in a much shorter heat path and higher cathode assembly component temperatures. In the example of FIG. 6A, the radiative and conductive heat paths are much longer relative to the previous prior art cathode assembly examples by separating the emitter insulator 612 and the at least one bias electrode insulator 614 into separate insulators. Arrows 630 illustrate the conductive heat path from the emitter 604 through the emitter insulator 612, through the cathode cup 606 to the at least one bias electrode insulator 614. In conductive heating, heat flows in the direction of decreasing temperatures. As such, less heating of cathode assembly components may occur.

Turning now to FIG. 6B, it illustrates a cross-section of a cathode assembly 650. The cathode assembly 650 is substantially identical to cathode assembly 600 except that cathode assembly 650 comprises a heat shield 652. As shown, the heat shield 652 may be a cylindrical heat shield and may extend from the cathode cup 606 into a space between the emitter 604, emitter insulator 612 and at least one bias electrode insulator 614. The heat shield 652 may be coupled to the cathode cup 606. Arrows 620 illustrate the radiative heat paths or direction of radiative heat from the emitter 604 being radiated to various components of the cathode assembly 650. In one example, the heat shield 652 substantially blocks the radiative heat 620 from the emitter 604 being radiated towards the at least one bias electrode, the cathode cup 606, and the at least one bias electrode insulator 614. The heat shield 652 may maintain heat within a close proximity of the emitter 604, which may maintain a high temperature of the emitter 604 and enhance electron emission. Additionally or alternatively, the heat shield 652 may reflect and/or re-radiate heat back to the emitter 604. Arrows 630 illustrate the conductive heat path from the emitter 604 through the emitter insulator 612, through the cathode cup 606 to the at least one bias electrode insulator 614. In conductive heating, heat flows in the direction of decreasing temperatures. As such, less heating of cathode assembly components may occur.

FIGS. 6A and 6B illustrate longer conductive and radiative heat paths in the cathode assembly than previous prior art examples of cathode assemblies that included a monolithic insulator, which resulted in much shorter heat paths and higher cathode assembly component temperatures. The current disclosure cathode assembly includes a much longer conductive heat path, and much longer radiative heat path, which may be shielded with a heat shield as shown in FIG. 6B. The most critical temperature in the cathode assembly is that of the bias electrode insulators. The current disclosure cathode assembly design takes the monolithic insulator of prior art cathode assembly designs and separates it into individual emitter insulators and individual bias electrode insulators. This keeps the emitter insulators and bias electrode insulators much cooler, due to the much longer conductive and radiative heat paths. An additional heat shield between the emitter, emitter insulators and the bias electrode insulators blocks the radiative heat path.

The emitter, emitter insulators and bias electrode insulators are separate components. In one example, a heat shield may be added between the emitter and the bias electrode insulators. The heat shield may protect the emitter insulators and the bias electrode insulators from direct heat radiation of the emitter, keeping the emitter insulators and the bias electrode insulators cooler; and reflects and/or re-radiates heat back to the emitter, keeping the emitter hotter at the same emitter power level. This is desirable in order to minimize the size of the power supply and to decrease a total heat injected into the cathode assembly. The emitter needs to be at a given temperature for the proper functioning of the cathode assembly. It is best to keep the emitter hot without heating up all of the other components around emitter.

The emitter insulators are separate components from and thermally decoupled from the bias electrode insulators. This is accomplished by using individual separate subassemblies or components and maximizing both the conductive and radiative heat paths from the emitter to the bias electrode insulators, resulting in less heating within the cathode assembly. In one example, a heat shield may be added in between the emitter and the bias electrode insulators to substantially block radiated heat from the emitter and reflect and/or re-radiate heat back to the emitter. The much longer heat paths results in less heating of the cathode assembly.

A cathode assembly of an X-ray tube may be fabricated via joining a plurality of components or subassemblies. By dividing the cathode assembly into a plurality of components or subassemblies, each component or subassembly may be fabricated based on its own manufacturing tolerances, thereby allowing components or subassemblies with lower tolerance thresholds to be manufactured with relatively less precise manufacturing techniques. A bias electrode may include any one of a width, length or focus electrode.

A technical effect of manufacturing the components or subassemblies separately is that individual components or subassemblies may be manufactured with high precision, thereby increasing reliability of the fabricated cathode assembly and improving manufacturing consistency. A further benefit to manufacturing the components or subassemblies separately is the optional inclusion of a heat shield which may promote enhanced emitter operation along with increased thermal separation of the emitter from other components of the cathode assembly. The cathode assembly is fabricated by joining a plurality of components or subassemblies together that meet tolerance specifications while providing manufacturability and thermal benefits.

As used herein, an element or step recited in the singular and proceeded with the word "a" or "an" should be understood as not excluding plural of the elements or steps, unless such exclusion is explicitly stated. Furthermore, references to "one embodiment" of the invention do not exclude the existence of additional embodiments or examples that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The methods and processes described herein may be carried out by computers, processors, machines, equipment, or other hardware components, or combinations thereof. As such, various actions, operations, processes, steps and/or functions described and/or illustrated may be performed in the sequence described and/or illustrated, in parallel, or in some cases omitted. Likewise, the order of processing is not necessarily required to achieve the features and advantages of the example embodiments described herein, but is provided for ease of illustration and description. One or more of the illustrated actions, operations, processes, steps and/or functions may be repeatedly performed depending on the particular strategy being used. Further, the described actions, operations, processes, steps and/or functions may be accomplished by instructions, software code, and/or firmware programmed into non-transitory memory of a computer readable storage medium of an electronic control system, where the described actions are carried out by executing the instructions, software code, and/or firmware of the electronic control system, including the various components described above in combination with an electronic controller, computer or processor.

This written description uses examples to disclose the present disclosure, including the best mode, and also to enable a person of ordinary skill in the relevant art to practice the present disclosure, including making and using any devices or systems and performing any methods. The patentable scope of the present disclosure is defined by the claims, and may include other examples that occur to those of ordinary skill in the art. Such other examples are intended to be within the scope of the claims if they have structural elements or method steps that do not differ from the literal language of the claims, or if they include equivalent structural elements or method steps with insubstantial differences from the literal languages of the claims.

We claim:

1. A method of manufacturing a cathode assembly of an X-ray tube, comprising:

fabricating an emitter assembly, the emitter assembly including an emitter coupled to an emitter support structure;

fabricating an electrode assembly including fabricating an electrode stack and coupling a plurality of bias electrodes to the electrode stack; and assembling the emitter assembly and the electrode assembly together;

wherein fabricating the emitter assembly includes fabricating a plurality of independent components to form the emitter support structure and assembling the emitter to the emitter support structure; and wherein fabricating the electrode assembly includes fabricating a plurality of independent components to form the electrode stack, fabricating a plurality of independent components to form the plurality of bias electrodes, assembling the electrode stack, and assembling the plurality of bias electrodes to the electrode stack.

2. The method of claim 1, wherein fabricating an electrode stack includes using a braze fixture for brazing a plurality of alternating metal conductor rings to a plurality of ceramic insulator rings.

3. The method of claim 1, wherein coupling a plurality of bias electrodes to the electrode stack includes:

using a width electrode welding fixture for laser welding at least two width electrodes to the electrode stack;

using a length electrode welding fixture for laser welding at least two length electrodes to the electrode stack;

using a focus electrode welding fixture for laser welding at least one focus electrode to the electrode stack; and using a cathode cup welding fixture and an emitter assembly fixture for laser welding the emitter assembly to the electrode stack.

4. The method of claim 1, wherein assembling the emitter assembly and the electrode assembly together includes using a high precision alignment tool to properly insert, position and align the emitter support structure within an opening of the electrode stack, the opening shaped to receive the emitter support structure therein.

5. The method of claim 1, wherein assembling the emitter assembly and the electrode assembly together further includes using a high precision alignment tool to properly insert, position and align the emitter within an opening between the plurality of bias electrodes.

* * * * *